(12) United States Patent
Liu

(10) Patent No.: US 9,925,482 B2
(45) Date of Patent: Mar. 27, 2018

(54) OIL FILTER ADAPTOR AND METHOD OF FORMING THE SAME

(71) Applicant: FORD GLOBAL TECHNOLOGIES, LLC, Dearborn, MI (US)

(72) Inventor: Changcheng Liu, Nanjing (CN)

(73) Assignee: Ford Global Technologies, LLC, Dearborn, MI (US)

( * ) Notice: Subject to any disclaimer, the term of this patent is extended or adjusted under 35 U.S.C. 154(b) by 183 days.

(21) Appl. No.: 14/925,032

(22) Filed: Oct. 28, 2015

(65) Prior Publication Data

US 2016/0144306 A1 May 26, 2016

(30) Foreign Application Priority Data

Nov. 20, 2014 (CN) .......................... 2014 1 0671042

(51) Int. Cl.
*B01D 27/08* (2006.01)
*B01D 29/96* (2006.01)
*B01D 35/30* (2006.01)
*B01D 35/31* (2006.01)

(52) U.S. Cl.
CPC ............ *B01D 35/306* (2013.01); *B01D 27/08* (2013.01); *B01D 29/96* (2013.01); *B01D 35/31* (2013.01); *B01D 2201/4023* (2013.01)

(58) Field of Classification Search
None
See application file for complete search history.

(56) References Cited

U.S. PATENT DOCUMENTS

| | | | |
|---|---|---|---|
| 4,626,344 A * | 12/1986 | Fick | B01D 35/143 116/70 |
| 5,928,511 A * | 7/1999 | Messner | B01D 29/21 210/248 |
| 7,507,339 B2 | 3/2009 | Gilles et al. | |
| 8,522,415 B2 | 9/2013 | Macey | |
| 2009/0001010 A1 * | 1/2009 | Ruffet | B01D 27/08 210/248 |
| 2013/0298509 A1 | 11/2013 | Magno, Jr. | |

FOREIGN PATENT DOCUMENTS

WO     2007062821     6/2007

\* cited by examiner

*Primary Examiner* — Benjamin M Kurtz
(74) *Attorney, Agent, or Firm* — Mohr Intellectual Property Law Solutions, P.C.

(57) ABSTRACT

The present invention in one or more embodiments provides an oil filter adaptor to engage an oil filter, where the oil filter adaptor includes a base and a neck extending from the base in a first direction and to engage the oil filter, the neck including a wall defining therein a passageway extending at least partially in the first direction, the wall defining thereupon a through-aperture extending in a wall thickness direction. The oil filter adaptor of the present invention may pre-discharge oil flowing out thereof when the oil filter is removed, avoiding oil splashing due to an otherwise large efflux of oil in a very short period of time.

15 Claims, 4 Drawing Sheets

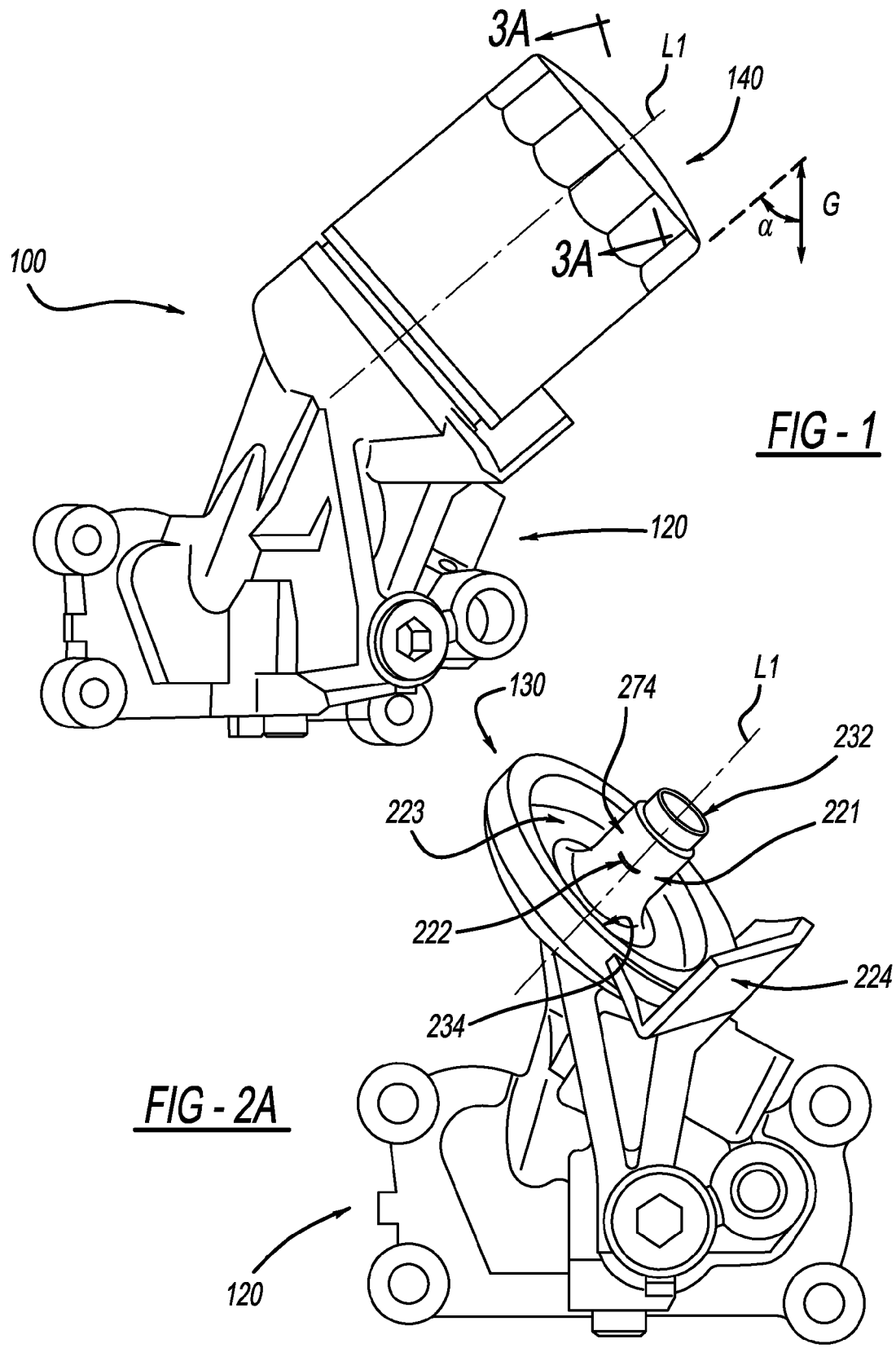

OIL FILTER ADAPTOR AND METHOD OF FORMING THE SAME

RELATED APPLICATION(S)

This application claims the benefit of Chinese New Invention Patent Application No.: CN 201410671042.8, filed on Nov. 20, 2014, the entire contents thereof being incorporated herein by reference.

TECHNICAL FIELD

The present invention relates to an oil filter adaptor and a method of forming the same.

BACKGROUND

In certain internal combustion engines, lubricant oil may need to be filtered to remove contaminants. In the automotive industry, oil filters such as spin-on oil filters may generally be used to filter the oil. Proper engine maintenance often requires that the oil filter be periodically removed and either cleaned or replaced to ensure proper oil filtration.

Spin-on oil filters are often mounted in an inverted position such that entry and exit openings of the filter face down while the filter housing faces up, due to limited package space inside the vehicle. While such an inverted orientation provides for good operation of the oil filter and may simplify the design of the oil flow passage to and from the oil filter, the design may be met with limitations particularly when it is time for maintenance where the filter may need to be removed from the oil filtration circuit. In particular, and when an inverted spin-on filter is removed, oil trapped within the volume of the filter housing may suddenly flow through the openings of the filter and causes spills over the filter mounting area and into the neighboring environment.

SUMMARY

At least one objective of the present invention is to provide an oil filter adaptor and a method of making the same to reduce oil splashing when oil filter is removed.

In one or more embodiments, the present invention provides an oil filter adaptor to engage an oil filter, wherein the oil filter adaptor includes a base and a neck extending from the base in a first direction and to engage the oil filter, the neck including a wall defining therein a passageway extending at least partially in the first direction and a through-aperture on the wall extending in a wall thickness direction different from the first direction.

In another or more embodiments, the present invention provides a method of making an oil filter adaptor to engage an oil filter, wherein the method includes positioning an initial oil filter adaptor, the initial oil filter adaptor including a base and a neck extending from the base in a first direction, the neck including a wall defining therein a passageway at least partially extending in the first direction, and creating on the wall a first through-aperture extending along a wall thickness direction to form the oil filter adaptor.

One or more advantageous features as described herein are believed to be readily apparent from the following detailed description of one or more embodiments when taken in connection with the accompanying drawings.

BRIEF DESCRIPTION OF THE DRAWINGS

Reference is now made to the one or more embodiments illustrated in greater detail in the accompanying drawings and described below wherein:

FIG. 1 illustratively depicts a perspective view of an oil filter assembly according to one or more embodiments of the present invention;

FIG. 2A illustratively depicts a perspective view of an oil filter adaptor of the oil filter assembly referenced in FIG. 1;

DETAILED DESCRIPTION OF ONE OR MORE EMBODIMENTS

Figure 2B:
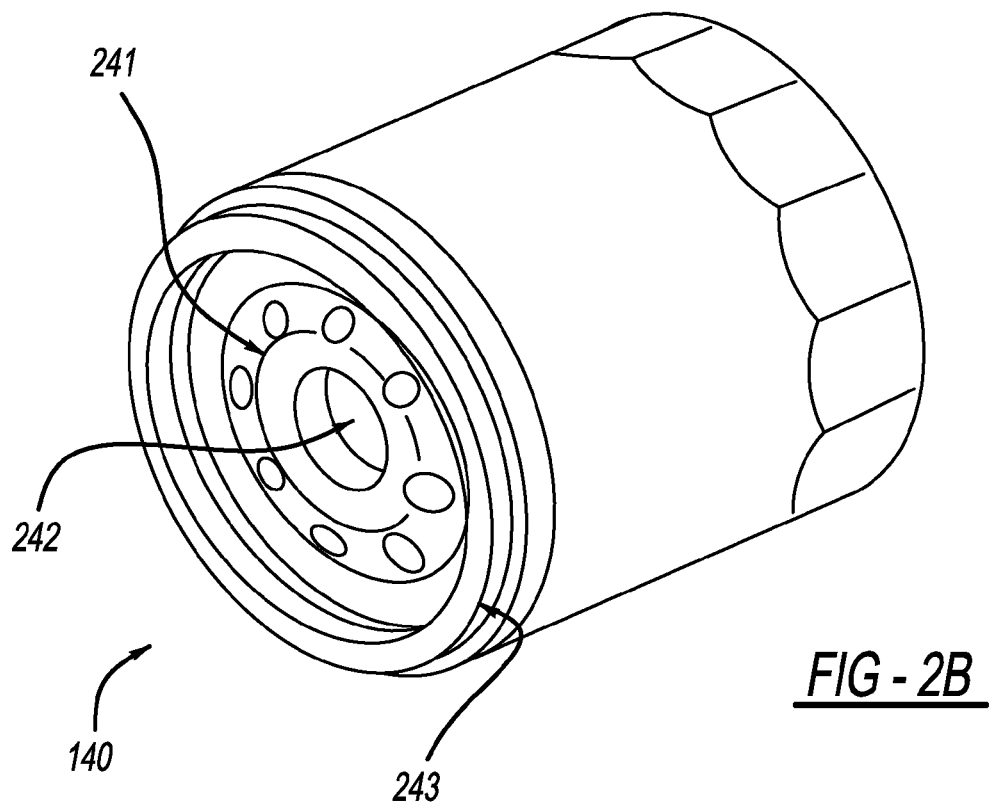
FIG. 2B illustratively depicts a perspective view of an oil filter of the oil filter assembly referenced in FIG. 1.

As referenced in the FIGS., the same reference numerals may be used herein to refer to the same parameters and components or their similar modifications and alternatives. These parameters and components are included as examples and are not meant to be limiting. The drawings referenced herein are schematic and associated views thereof are not necessarily drawn to scale.

The present invention in one or more embodiments is believed to be advantageous in providing cost-effectively an oil filter adaptor with a neck, the neck defining thereupon a through-aperture to communicate with an oil passageway. By this design, the through-aperture may be used to pre-discharge the oil trapped in the oil filter before the oil filter is removed for service, thus allowing ample time for the oil to flow out of the oil filter and avoiding unwanted oil overflow in an undesirably short period of time. In addition, the through-aperture may work together with a deflector to further reduce unwanted oil splashing.

FIG. 1 illustratively depicts a perspective view of an oil filter assembly according to one or more embodiments of the present invention. The oil filter assembly 100 includes an oil filter adaptor 120 and an oil filter 140 supported on the oil filter adaptor 120. Further in view of FIG. 2A and FIG. 2B, the oil filter 140 referenced in FIG. 1 may be mounted in an inverted fashion onto the oil filter adaptor 120, that is the oil opening for oil entry into and exit out of the oil filter faces down in a direction with any suitable degree relative to a direction of gravity "G". In particular reference to FIG. 2B, the oil filter 140 includes an oil outlet 242 and one or more oil inlets 241 surrounding the oil outlet 242.

With continuing reference to FIG. 2A, which illustratively depicts a view of the oil filter assembly 100 referenced in FIG. 1 yet with the oil filter 140 removed. The oil filter adaptor 120 referenced in FIG. 2A includes a base 130 and a neck 221 extending in a first direction "L1" and to at least partially engage the oil filter 140. The first direction "L1" may be of any suitable degree relative to the direction of gravity "G". In one or more embodiments, the first direction "L1" may be within plus or minus 45 degrees, 35 degrees, 25 degrees or 15 degrees relative to the direction of gravity "G".

Referring back to FIG. 2A, the neck 221 extends from the base 130 via a base end 234 and terminates at a top end 232. In particular and further in view of FIG. 2A, the neck 221 extends via the base end 234 from an adaptor plate 223 of the base 130. The neck 221 may be of any geometrical shape in cross-section and may be of any suitable length along the first direction "L1". As mentioned herein elsewhere, the oil filter adaptor 120 is attached to oil filter 140 via the neck 221 being at least partially received within the oil outlet or cavity 242 of the oil filter 140.

Figure 3A:
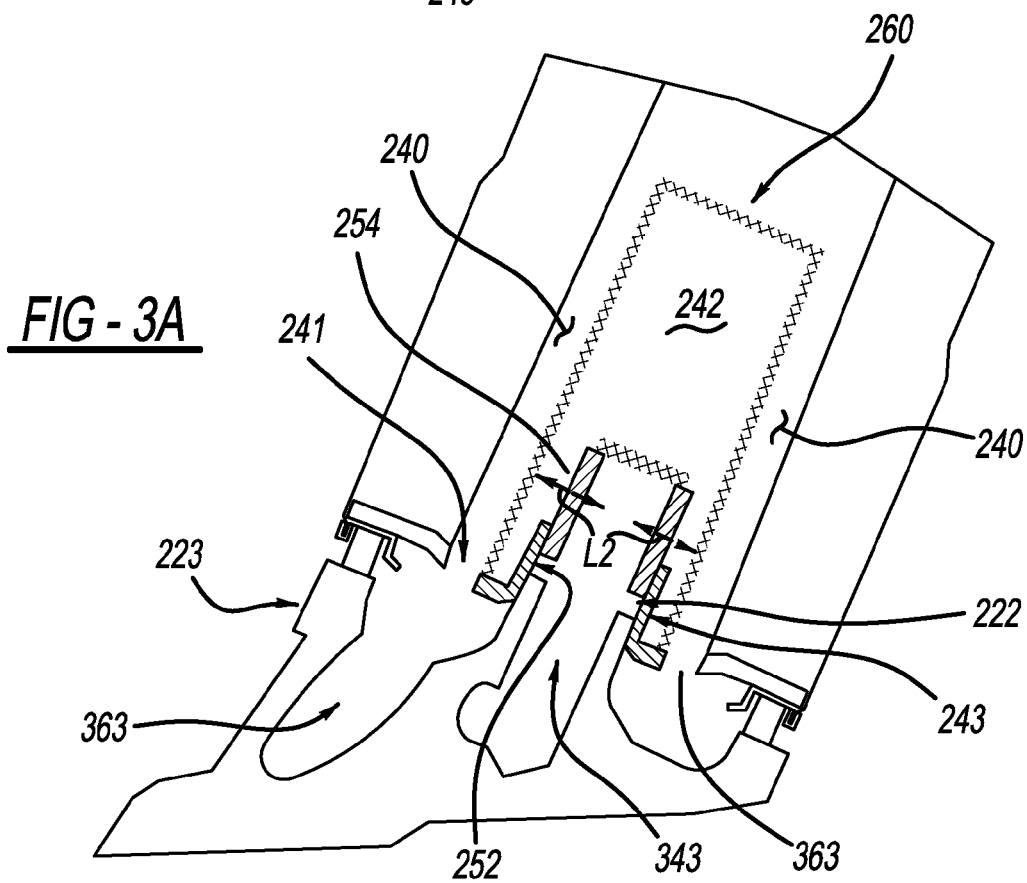
FIG. 3A illustratively depicts a cross-sectional view of the oil filter referenced in FIG. 2B and in view of FIG. 1, taken along 3A-3A.

Referring back to FIG. 3A, which illustratively depicts a cross-sectional view of the oil filter assembly 100 referenced in FIG. 1 taken along line 3A-3A, where the oil filter 140 and the oil filter adaptor 120 are in an engaged position. As illustratively depicted in FIG. 3A, the neck 221 may include a wall 274 defining therein a first passageway 343 at least partially extending in the first direction "L1" and a through-aperture 222 extending in a second direction "L2" or a wall thickness direction.

The engagement between the oil filter 140 and the oil filter adaptor 120 may be realized via any suitable methods. In one or more embodiments, the oil filter 140 may engage the oil filter adaptor 120 by intermeshed threads. For instance, an inner surface of the wall of the oil outlet 242 of the oil filter 140 may be provided with an inside thread area 252, while an outer surface of the wall of the neck 221 of the oil filter adaptor 120 may be provided with an outside thread area 254. The outside thread area 254 may be post-formed onto or made integral to the wall 274. Further, the through-aperture 222 may be formed on the outside thread area 254 such that oil flow via the through-aperture 222 may only be realized via at least a partial disengagement of the inside thread area 252 relative to the outside thread area 254.

A filter material 260 may be positioned within a cavity 240 of the oil filter 140 for oil filtration. The oil filter adaptor 120 includes a first passageway 343 to communicate with the cavity 240 via oil outlet 242 and a second passageway 363 to communicate with oil inlet 241. In operation, oil flows to the oil inlet 241 of the oil filter 140 via the second passageway 363, and then to the first passageway 343 via the cavity 242 after passing through the filter material 260. Oil does not ordinarily flow out of the through-aperture 222, because the through-aperture 222 is blocked by the wall 274 of the oil outlet 242.

Figure 3B:
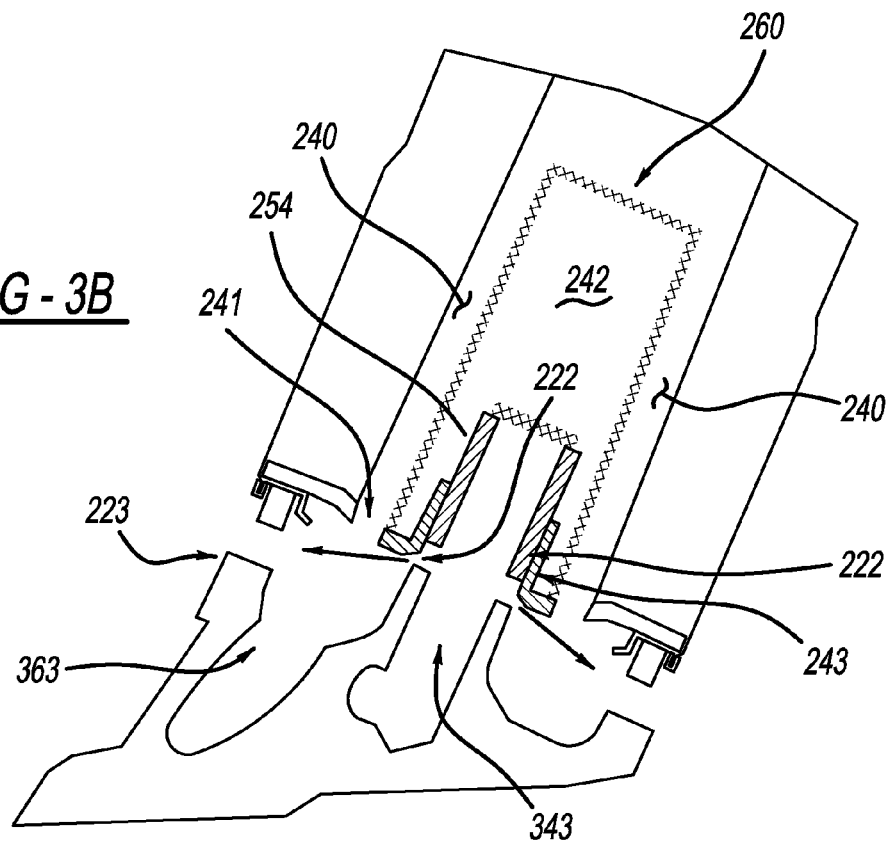
FIG. 3B illustratively depicts another view of the oil filter referenced in FIG. 3A, at a disengaged position.

When maintenance of the oil filter 140 is desirable, a technician may make a counterclockwise turn and loosen the oil filter 140 in the first direction "L1". FIG. 3B illustratively depicts a cross-sectional view similar to that of FIG. 3A yet with the oil filter 140 being positioned during a disengagement process, where the through-aperture 222 becomes at least partially open via gradual disengagement of the inside thread area 252 of the oil outlet 242 of the oil filter 140 relative to the outside thread area 254 of the neck 221. Optionally, the through-aperture 222 may be positioned outside of the oil outlet 242. Because at this position the through-aperture 222 is at least not fully blocked by the wall 243 of the oil outlet 242, any oil trapped within the oil filter 140 may be pre-discharged through the through-aperture 222 communicating with the first passageway 343. The technician may wait briefly or continue making counter-clockwise turns and loosening the oil filter 140 so as to allow oil to flow via the through-aperture 222 more quickly. When the oil filter 140 fully disengages the neck 221, residual oil within the oil filter 140 may flow out of the oil outlet 242. Some of the oil has already been pre-discharged via the through-aperture 222 before the rest of the oil flows out of the oil outlet 242, thus no excessive oil may flow out of the oil outlet 242 in a very short period of time, so as reduce issues associated with oil splashing. Furthermore, the shape and size of the through-aperture 222 may be suitably varied dependent upon the pre-discharge speed that may be desirable.

The through-aperture 222 may be positioned closer to the base end 234 than the top end 232 of the neck 221. This may be particularly beneficial for the oil removal to occur soon after the disengagement of the oil filter 140 from the oil filter adaptor 120 starts. Accordingly, relatively more time is allotted for the removal of residual oil from the oil filter 140 out through the through-aperture 222.

Referring back to FIG. 2A, the deflector 224 may be attached to the base 130 or the neck 221, in particular the adaptor plate 223 of the base 130, where the through-aperture 222 is positioned between the deflector 224 and the top end 232 of the neck 221. The through-aperture 222 is positioned so that the oil flowing out thereof is to contact the deflector 224. In this arrangement, the through-aperture 222 may be elongated and extend in a third direction "L3". The through-aperture 222 may be of an elongated width along the third direction L3 that is no greater than a maximum cross-sectional width of the deflector 224 along the third direction "L3" so as to reduce oil splashing outside of the deflector 224. In certain embodiments, the through-aperture 222 may be rectangular, circular, or of any suitable shape in cross-section.

Referring back to FIG. 3A, the through-aperture 222 at least partially opens into the first passageway 343 so as to provide a direct outlet for the oil release. Wherein, in one or more embodiments, the second direction "L2" may be the wall thickness direction, for instance, with a degree relative to the first direction "L1". However, the second direction may be of any suitable angle relative to the first direction. Furthermore, the outer contour of the through-aperture 222 may also be arranged in the shape of an arc so as to more effectively control the oil flow speed and to direct the oil flow.

Figure 4A:
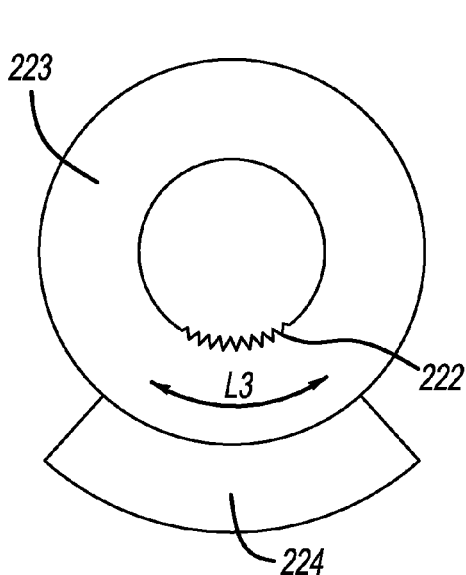
FIG. 4A illustratively depicts a partial top view of the oil filter adaptor referenced in FIG. 2A according to one embodiment of the present invention.
Figure 4B:
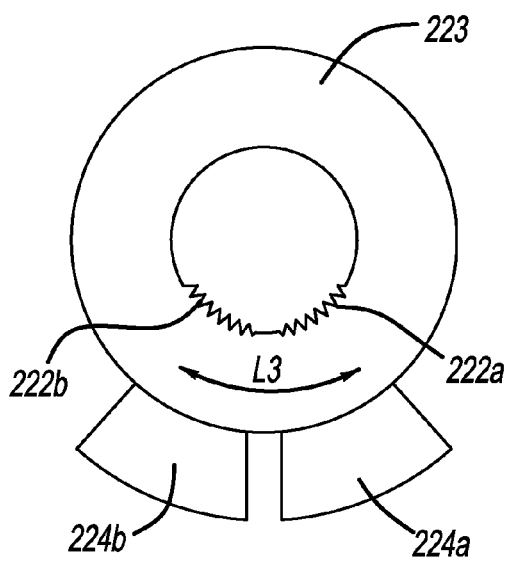
FIG. 4B illustratively depicts a partial bottom view of the oil filter adaptor referenced in FIG. 2A according to another embodiment of the present invention.

FIG. 4A illustratively depicts a partial top view of the oil filter adaptor 120 referenced in FIG. 2A. Although the FIG. 4A illustratively depicts one through-aperture 222 and one deflector 224, in other embodiments, a number of through-apertures and deflectors, and a number of through-apertures and one deflector may be employed. For instance, FIG. 4B illustratively depicts a first through-aperture 222a, a second through-aperture 222b spaced apart from the first through-aperture 222a, and a first deflector 224a and a second deflector 224b corresponding to the first through-aperture 222a and the second through-aperture 222b, respectively. In view of FIG. 2A, and in one or more embodiments, the first deflector 224a and the second deflector 224b each are attached to the base 130 and in particular the adaptor plate 223 of the base 130, or to the neck 221. The first through-aperture 222a and the second through-aperture 222b are positioned between a top end 232 of the neck and the first and second deflectors 224a, 224b, respectively, where the first deflector 224a and the second deflector 224b may be at least partially spaced apart from each other.

As referenced in FIGS. 1, 2A-2B, 3A-3B, 4A-4B and 5, the through-aperture 222 or the first through-aperture 222a and the second through-aperture 222b may be of any suitable dimensions both in width along the third direction "L3" and/or in height along the first direction "L1" based upon the particular oil filtering project at hand. In certain embodiments, the width is no smaller than 0.5 centimeters (cm), 1 cm, 1.5 cm, 2 cm, 2.5 cm or 3 cm.

Figure 5:
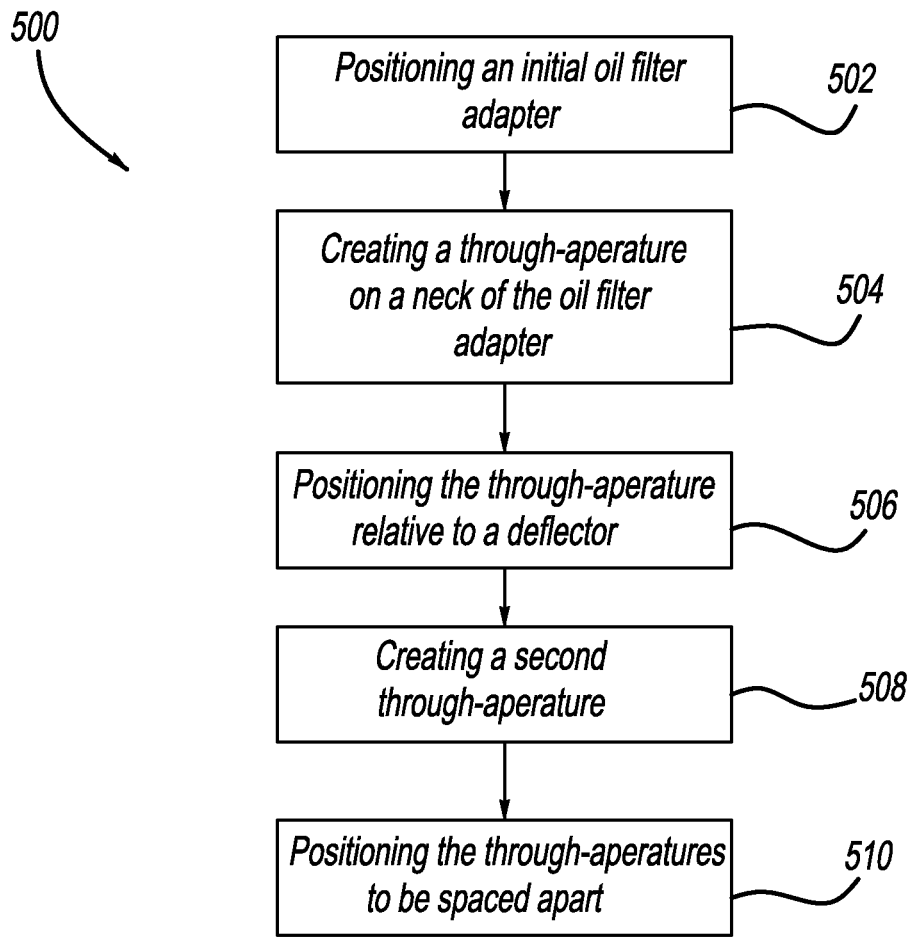
FIG. 5 illustratively depicts a block view of a non-limiting method of forming the oil filter assembly referenced in FIG. 1.

According to one or more embodiments, and as illustratively depicted in FIG. 5, the present invention also provides a method generally shown at 500 of making the oil filter adaptor 120 to engage the oil filter 140. The method 500 includes, and at step 502, positioning an initial oil filter adaptor (not shown), the initial oil filter adaptor including the base 130 and the neck 221 extending from the base 130 in the first direction "L1". The neck 221 includes the wall 274 defining therein the passageway 343 at least partially extending in the first direction "L1".

As step 504, the method 500 further includes creating the first through-aperture 222a on the wall 274 along the wall thickness direction or the second direction "L2" to form the oil filter adaptor 120. Accordingly, the through-aperture may be cost effectively formed onto any existing oil filter such that the through-aperture as formed may function as a handy oil outlet for reducing unwanted oil spill. This method may be particularly beneficial for certain types of vehicles where existing equipment or cost restraints do not accommodate new tooling associated building an oil filter adaptor 120 de novo or from scratch. The method 500 provides a cost effective alternative to creating oil outlet on an otherwise existing oil filter adaptor and hence direct benefits in labor and maintenance.

As indicated at step 506, the first through-aperture 222 is formed to be positioned so that oil flow out of the first through-aperture is to contact the deflector 224 attached to at least one of the base 130 and the neck 221. This step may be particularly beneficial to provide at least a temporary reservoir in form of the deflector 224 for oil flowing out from the first through-aperture 222 to accommodate with various needs in letting the excess oil out of the oil filter 140 during removal thereof.

As indicated at step 508, the first through-aperture 222a may be elongated in the third direction "L3". This step may be particularly beneficial in that relatively greater availability is provided for the oil release with each round of disengagement of the threaded areas, simply as increasing amount of oil release is realized as the disengagement proceeds along at least partially the third direction "L3".

As indicated at step 510, the first through-aperture 222a and the second through-aperture 222b at least partially spaced apart from the first through-aperture 22a are formed on the wall 274. This step may further be particularly beneficial for certain oil filter adaptor, where creating a single through-aperture with an extended width along the third direction may not be practical without jeopardizing the mechanical integrity of the oil filter adaptor itself. In these instances, two or more through-apertures such as the apertures 222a and 222b may be created with solid wall material left in between for any needed mechanical strength and integrity.

Steps 502 through 510 have been depicted in FIG. 5 in the form of a block diagram or a flow chart; however steps as shown do not necessarily to have to follow the order as depicted in FIG. 5. For instance, the method 500 may not necessarily include step 510, or step 506 may not necessarily be carried out after step 504. Accordingly, the method 500 may be provided with any suitable variations consistent with what is described herein elsewhere in relation to the oil filter assembly 100 or the parts thereof.

In one or more embodiments, the present invention as set forth herein is believed to have overcome certain challenges associated with the existed oil filter adaptor. However, one skilled in the art will readily recognize from such discussion, and from the accompanying drawings and claims that various changes, modifications and variations can be made therein without departing from the true spirit and fair scope of the invention as defined by the following claims.

What is claimed is:

1. An oil filter adaptor to engage an oil filter, comprising:
a base;
a neck extending from the base in a first direction and to engage the oil filter, the neck including a wall defining therein a passageway extending at least partially in the first direction, the wall defining thereupon a first through-aperture extending in a wall thickness direction, and a second through-aperture extending in a wall thickness direction and spaced apart from the first through-aperture, and
a first deflector and a second deflector each attached to at least one of the base and the neck, the first and second through-apertures being positioned between a top end of the neck and the first and second deflectors, respectively.

2. The oil filter adaptor of the claim 1, wherein the first through-aperture and the second through aperture at least partially open into the passageway.

3. The oil filter adaptor of the claim 2, wherein the first through-aperture and the second through-aperture are positioned such that oil flowing out of the first through-aperture and the second through-aperture is to contact the first deflector and the second deflector.

4. The oil filter adaptor of the claim 1, wherein the first through-aperture is of an elongated width along a third direction, different from the first direction or the wall thickness direction, that is no greater than a maximum cross-sectional width of the deflector along the third direction.

5. The oil filter adaptor of the claim 1, wherein the first and second deflectors are at least partially spaced apart from each other.

6. The oil filter adaptor of the claim 1, wherein each of the first and second deflectors is attached to the base along a portion of a peripheral circumference of the base and includes a first sidewall facing the first through-aperture and a second sidewall facing the second through-aperture, respectively and are spaced apart from the base.

7. The oil filter adaptor of the claim 1, wherein the first through-aperture is blocked by a wall of an oil outlet when the oil filter is engaged with the oil filter adaptor.

8. A method of making an oil filter adaptor to engage an oil filter, comprising:
positioning an initial oil filter adaptor, the initial oil filter adaptor including a base and a neck extending from the base in a first direction, the neck including a wall defining therein a passageway at least partially extending in the first direction;
creating a first through-aperture and a second through-aperture on the wall along a wall thickness direction different from the first direction to form the oil filter adaptor; and
attaching a first deflector and a second deflector to the base along a portion of a peripheral circumference of the base, wherein each of the first and second deflectors includes a wall facing the first through-aperture and the second through-aperture, respectively, and spaced apart from the base.

9. The method of the claim 8, wherein the first through-aperture is created to be positioned such that oil flowing out of the first through-aperture is to contact the first deflector.

10. The method of the claim 8, wherein the first through-aperture is created to be elongated in a third direction different from the first direction or the wall thickness direction.

11. The method of the claim 8, wherein the first and second through-apertures are created to be at least partially spaced apart from each other.

12. An oil filter adaptor to engage an oil filter, comprising:
   a base;
   a neck extending from the base in a first direction and to engage the oil filter, the neck including a wall defining therein a passageway extending at least partially in the first direction, the wall defining thereupon a first through-aperture extending in a wall thickness direction different from the first direction, the first through-aperture being at least partially open to the passageway; and
   a deflector attached to at least one of the base and the neck, the first through-aperture being positioned between the deflector and a top end of the neck along the first direction such that oil flowing out of the first through-aperture is to contact the deflector; and
   a second through-aperture spaced apart from the first through-aperture, wherein the deflector includes first and second deflectors each attached to at least one of the base and the neck, the first and second through-apertures being positioned between a top end of the neck and the first and second deflectors, respectively.

13. The oil filter adaptor of the claim 12, wherein the first through-aperture is of an elongated width along a third direction different from the first direction or the wall thickness direction and being no greater than a maximum cross-sectional width of the deflector along the third direction.

14. The oil filter adaptor of the claim 12, wherein the first through-aperture is positioned closer to a base end of the neck than a top end of the neck along the first direction, the neck extending from the base via the base end.

15. The oil filter adaptor of the claim 12, wherein the first and second deflectors are at least partially spaced apart from each other.

* * * * *